United States Patent
Perez et al.

(10) Patent No.: US 11,743,992 B2
(45) Date of Patent: Aug. 29, 2023

(54) SYSTEMS AND METHODS FOR LIGHTING AN ENVIRONMENT

(71) Applicant: RENSSELAER POLYTECHNIC INSTITUTE, Troy, NY (US)

(72) Inventors: Octavio Luis Perez, Troy, NY (US); Michael Shur, Latham, NY (US); Robert F. Karlicek, Jr., Mechanicville, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 15/315,115

(22) PCT Filed: Jun. 15, 2015

(86) PCT No.: PCT/US2015/035770
§ 371 (c)(1),
(2) Date: Nov. 30, 2016

(87) PCT Pub. No.: WO2015/195525
PCT Pub. Date: Dec. 23, 2015

(65) Prior Publication Data
US 2017/0099713 A1 Apr. 6, 2017

Related U.S. Application Data

(60) Provisional application No. 62/012,579, filed on Jun. 16, 2014.

(51) Int. Cl.
*H05B 47/10* (2020.01)
*H05B 47/105* (2020.01)
(Continued)

(52) U.S. Cl.
CPC .......... *H05B 47/105* (2020.01); *H05B 45/20* (2020.01); *H05B 47/11* (2020.01); *H05B 47/115* (2020.01); *H05B 47/155* (2020.01); *H05B 47/16* (2020.01)

(58) Field of Classification Search
CPC ............ F21Y 2101/00; F21Y 2103/10; F21Y 2103/33; F21Y 2105/12; F21Y 2105/10;
(Continued)

(56) References Cited

U.S. PATENT DOCUMENTS 6,616,291 B1 * 9/2003 Love .................. F21S 8/00
315/185 R
10,368,420 B2 * 7/2019 Chraibi ............... H05B 47/105
(Continued)

FOREIGN PATENT DOCUMENTS

EP 2009795 A1 12/2008

OTHER PUBLICATIONS

International Search Report issued in PCT/US2015/035770 dated Sep. 30, 2015 (3 pages).
(Continued)

*Primary Examiner* — Thai Pham
(74) *Attorney, Agent, or Firm* — Murtha Cullina LLP; Anthony P. Gangemi

(57) ABSTRACT

Systems and methods for lighting an environment are disclosed. A lighting system includes at least one light source and a control system in communication with the at least one light source. The light source is configured to emit light having a plurality of emission characteristics. The control system is configured to randomly vary at least one of the emission characteristics of the light emitted by the light source. A method for lighting an environment includes emitting light from a light source, and randomly varying at least one of the emission characteristics of the emitted light.

28 Claims, 3 Drawing Sheets

(51) Int. Cl.
  *H05B 47/11* (2020.01)
  *H05B 45/20* (2020.01)
  *H05B 47/16* (2020.01)
  *H05B 47/155* (2020.01)
  *H05B 47/115* (2020.01)

(58) Field of Classification Search
  CPC .............. F21Y 2113/13; F21Y 2115/10; H05B 33/0803; H05B 33/0857; H05B 33/0842; H05B 33/0818; H05B 33/0827; H05B 33/0845; H05B 33/0854; H05B 33/0863; H05B 33/0869; H05B 33/0809; H05B 33/0815; H05B 37/029; H05B 37/0254; H05B 37/02; H05B 37/0218; H05B 37/0272; H05B 37/0227; H05B 47/105; H05B 47/115; H05B 47/11; H05B 45/20; H05B 47/16; H05B 47/155; H05B 47/10; H05B 47/12; Y02B 20/40
  See application file for complete search history.

(56) References Cited

U.S. PATENT DOCUMENTS

| | | | | |
|---|---|---|---|---|
| 2005/0174065 | A1* | 8/2005 | Janning | H05B 33/0803 |
| | | | | 315/185 S |
| 2006/0071605 | A1* | 4/2006 | Diederiks | H05B 47/125 |
| | | | | 315/76 |
| 2008/0007497 | A1* | 1/2008 | Pauritsch | G09G 3/3406 |
| | | | | 345/82 |
| 2010/0020536 | A1 | 1/2010 | Bafetti et al. | |
| 2010/0171442 | A1 | 7/2010 | Draper et al. | |
| 2010/0174345 | A1* | 7/2010 | Ashdown | A61N 5/0618 |
| | | | | 607/88 |
| 2013/0134902 | A1* | 5/2013 | Mahale | H05B 47/115 |
| | | | | 315/297 |
| 2013/0257894 | A1 | 10/2013 | Morgan et al. | |
| 2014/0292226 | A1* | 10/2014 | Ramer | H05B 47/155 |
| | | | | 315/307 |
| 2015/0145418 | A1* | 5/2015 | Pope | H05B 33/0854 |
| | | | | 315/152 |
| 2018/0279956 | A1* | 10/2018 | Waydo | A61B 5/349 |

OTHER PUBLICATIONS

Written Opinion of the International Search Authority issued in PCT/US2015/035770 dated Sep. 30, 2015 (8 pages).
International Preliminary Report on Patentability with Written Opinion Of The International Searching Authority for PCT/US2015/035770, dated Dec. 29, 2016, 10 pages.

* cited by examiner

SYSTEMS AND METHODS FOR LIGHTING AN ENVIRONMENT

CROSS REFERENCE TO RELATED APPLICATIONS

This application is the U.S. National Phase application of PCT/US2015/035770, filed Jun. 15, 2015, which claims priority to U.S. Patent Application No. 62/012,579, entitled "SMART HUMAN LIGHTING," filed Jun. 16, 2014, the contents of which are incorporated herein by reference in their entirety.

STATEMENT REGARDING FEDERALLY SPONSORED RESEARCH

This invention was made with government support under Contract Agreement No. NSF EEC-0812056 awarded by the National Science Foundation. The Government has certain rights in this invention.

FIELD OF THE INVENTION

The present invention relates generally to lighting systems, and more particularly, to systems and methods for variably lighting an environment.

BACKGROUND OF THE INVENTION

Systems of lighting are a ubiquitous aspect of modern society. Many studies have been conducted regarding the impact of such lighting systems on the biological entities they illuminate. These studies have given rise to various forms of dynamic lighting. Nonetheless, conventional lighting systems lack the ability to improve or optimize the psychophysiological performance of the subjects of lighting. Existing dynamic lighting options, in fact, are incapable of such optimization. Accordingly, there remains a need for more robust and versatile lighting systems.

SUMMARY OF THE INVENTION

Aspects of the present invention are directed to systems and methods for lighting an environment.

In accordance with one aspect of the present invention, a lighting system is disclosed. The lighting system includes at least one light source and a control system in communication with the at least one light source. The light source is configured to emit light having a plurality of emission characteristics. The control system is configured to randomly vary at least one of the emission characteristics of the light emitted by the light source.

In accordance with another aspect of the present invention, a method for lighting an environment is disclosed. The method includes emitting light from a light source, and randomly varying at least one of the emission characteristics of the emitted light.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures.

DETAILED DESCRIPTION OF THE INVENTION

The exemplary lighting systems and methods described herein are usable to variably illuminate an indoor or outdoor environment. As described herein, any number of characteristics of the light may be varied in accordance with aspects of the present invention. While the disclosed embodiments are primarily described with respect to varying the illumination of a living subject, it will be understood that the invention is not so limited. The disclosed embodiments may be usable to illuminate any environment regardless of the presence or absence of living subjects.

The exemplary systems and methods disclosed herein may be particularly suitable for affecting the psychophysiological performance of the lighting's subject. The lighting systems and methods of the present invention may vary the delivery of light to the subject in order to achieve certain physiological targets (such as optimizing comfort, performance, and/or health, etc.). Performance improvements including better health, more effective education, increased alertness, elevated mood, decreased stress, and increased productivity or cognition may all be achieved using the disclosed embodiments. Particularly, the disclosed embodiments may be used to vary light elements at frequencies that stimulate brainwave entrainment in a live subject, in order to promote desired behaviors or responses.

Figure 1:
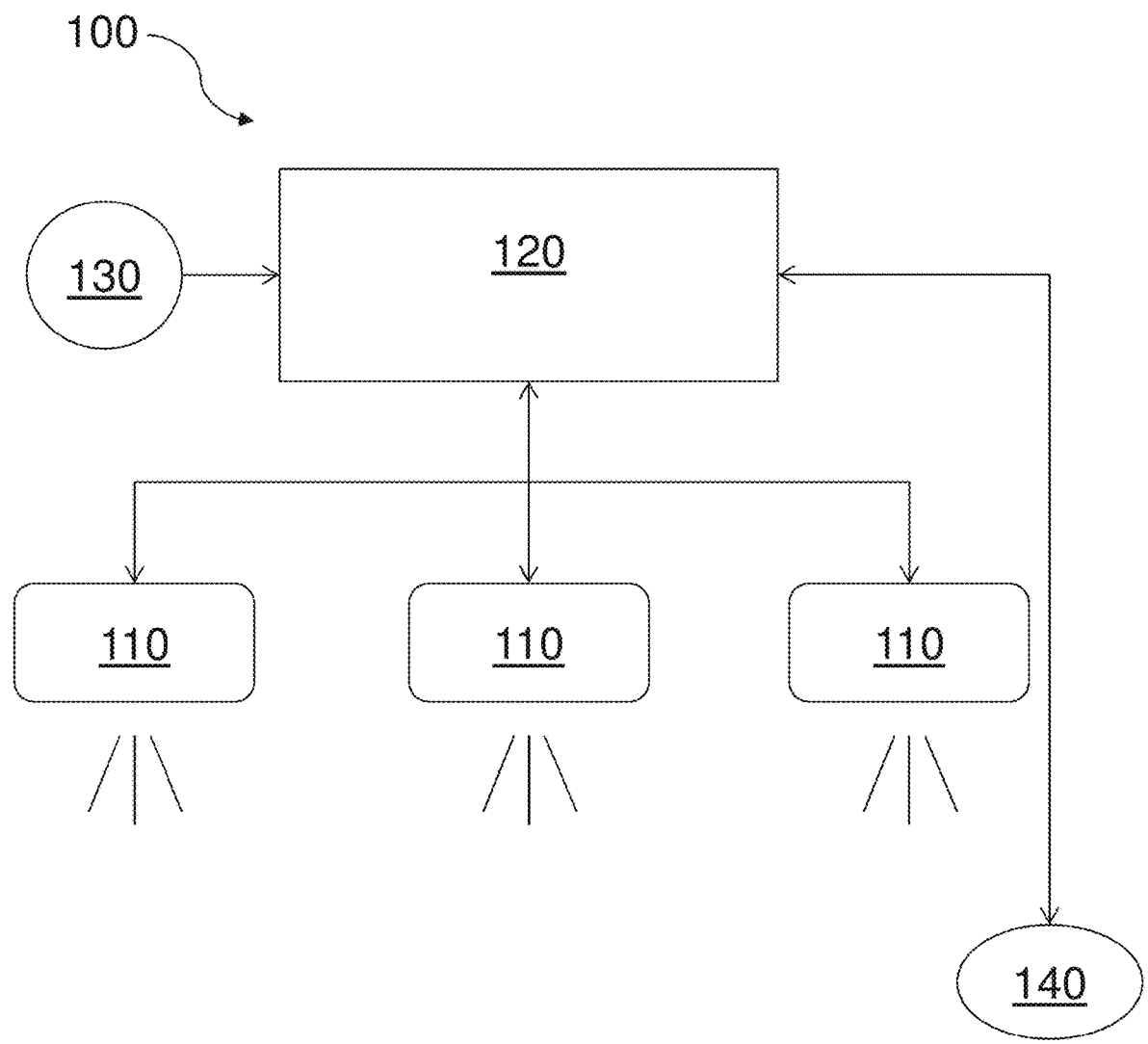
FIG. 1 is a diagram illustrating an exemplary lighting system in accordance with aspects of the present invention.

With reference to the drawings, FIG. 1 illustrates an exemplary lighting system 100 in accordance with aspects of the present invention. System 100 is usable to illuminate an environment. In general, system 100 includes at least one light source 110 and a control system 120. Additional details of system 100 are described below.

Light sources 110 are configured to emit light. The light emitted by light sources 110 has a plurality of emission characteristics.

As used herein, the term "emission characteristics" refers to any feature or measure relating to, describing, or classifying a type of light. Emission characteristics may apply to light from a single light source 110, or may apply to light from multiple light sources 110. Emission characteristics of the light emitted by light sources 110 include, by way of example, intensity, spectral power density, and spatial gradient. The intensity of light refers to the irradiance produced by one or more of the light sources 110. The spectral power density of light refers to the power of light emitted by one or more light sources 110 at each point along the electromagnetic spectrum. The spatial gradient of light refers to changes in the light emitted by light sources 110 at each point within the environment being illuminated by lighting system 100. Other emission characteristics of light will be known to one of ordinary skill in the art from the description herein.

In an exemplary embodiment, light sources 110 comprise solid state lighting elements, such as light-emitting diodes (LEDs). Light sources 110 may all be the same type of lighting element (and emit light having the same emission characteristics), or one or more of light sources 110 may be a different type of lighting element (and emit light having different emission characteristics).

Figure 2A:
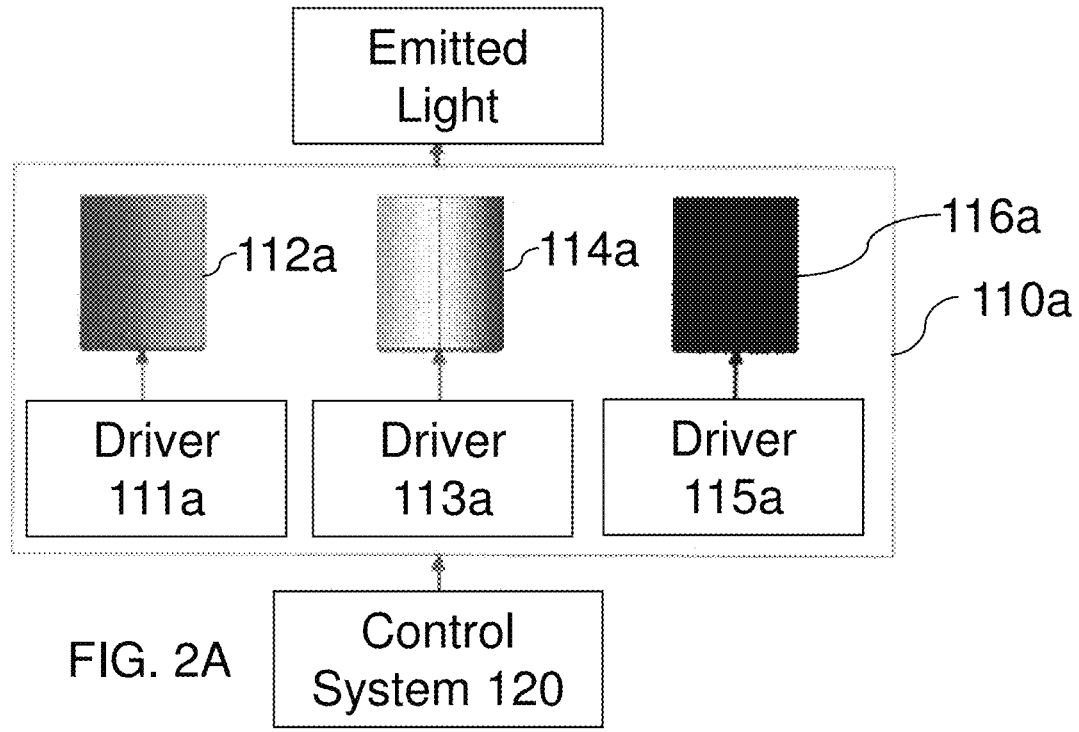
FIGS. 2A and 2B are images illustrating an exemplary spectrum control for the lighting system of FIG. 1.
Figure 2B:
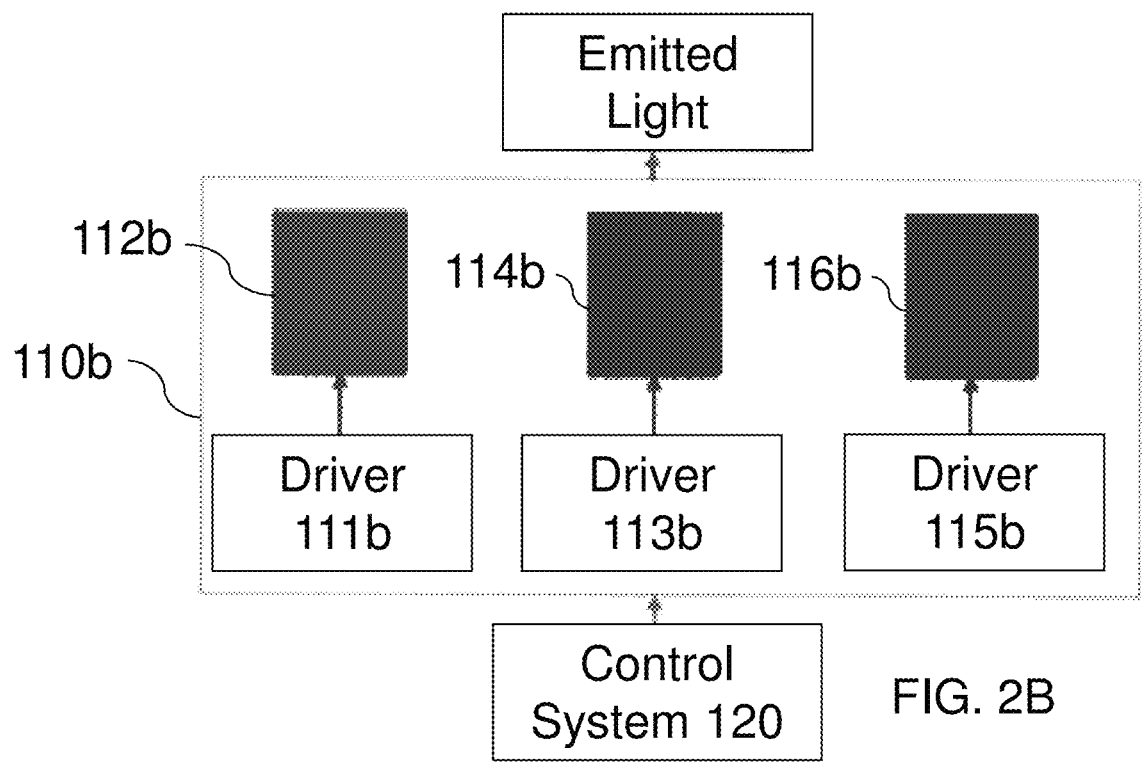

In a preferred embodiment, each light source 110 is formed from a set of solid state lighting elements. Each solid state lighting element in the set is adapted to emit light having different spectral power densities. The different spectral densities may be within the visible region, or may be throughout the electromagnetic spectrum. As shown in FIG. 2A, one light source 110a may include a predominantly blue solid state light 112a, a predominantly green solid state light 114a, and a predominantly red solid state light 116a. As shown in FIG. 2B, another light source 110b may include a predominantly ultraviolet solid state light 112b, a predominantly visible solid state light 114b, and a predominantly infrared solid state light 116b. System 100 may include one or more light sources 110 of each style, or light sources 110 may include other combinations of solid state lights, as would be understood by one of ordinary skill in the art from the description herein.

The number of lighting elements in each light source 110 is provided for the purposes of illustration, and is not intended to be limiting. Each light source 110 may include a single lighting element, or may include a plurality of light elements. Light sources 110 may include as many as 10-12 solid state lighting elements or more without departing from the scope of the present invention.

While light sources 110 are described in one embodiment as incorporating solid state lighting elements, it will be understood that the invention is not so limited. To the contrary, light sources 110 may include any type of lighting element that would be known to one of ordinary skill in the art from the description herein. Light sources 110 may include, for example, incandescent lights, fluorescent lights, electroluminescent lights, laser lights, or any combination thereof. The type and number of light sources 110 may be chosen based on the size of the environment to be illuminated, the desired brightness of the illumination, the desired effects to be created by system 100, or based on any other factors that would be known to one of ordinary skill in the art from the description herein.

While light sources 110 are described in one embodiment as generally emitting visible light, it will be understood that the invention is not so limited. For example, one or more light sources 110 may be configured to emit light having wavelengths falling at any points within the infrared or ultraviolet portions of the electromagnetic spectrum.

The number of light sources 110 shown in FIG. 1 is provided for the purposes of illustration, and is not intended to be limiting. Any number of light sources 110 may be utilized without departing from the scope of the present invention. The number of light sources 110 may be chosen, for example, based on the size of the environment to be illuminated, the desired brightness of the illumination, the desired effects to be created by system 100, or based on any other factors that would be known to one of ordinary skill in the art from the description herein.

Control system 120 is in communication with at least one light source 110. Where system 100 includes multiple light sources 110, control system 120 may communicate with each light source 110. Additionally, while a single control system 120 is shown in FIG. 1, it will be understood that the invention is not so limited. To the contrary, multiple control systems 120 could be implemented.

In one embodiment, each light source 110 may include an associated control system. In this embodiment, the control systems may operate independently to control only the associated light source 110, or may operate in communication with one another. In a further exemplary embodiment, each light source 110 includes an associate control system that communications with a master control system 120. The master control system 120 performs global control of all light sources 110 in accordance with the description herein, while the distributed control systems provide more granular control of their respective light sources 110.

Control system 120 includes one or more components for performing the functions recited herein. Control system 120 may be implemented in numerous ways, including the use of hardware components, one or more microprocessors programmed with software for performing the disclosed functions, or as a combination of hardware components and programmed microprocessors, along with associated circuitry for performing the functions described herein.

Control system 120 controls the emission characteristics of light emitted by light sources 110. In particular, control system 120 is configured to randomly vary at least one emission characteristic of the light emitted by light sources 110. As used herein, the phrase "randomly vary" or "random variance" refers to any change to the at least one emission characteristic in which one or more factors of the change are randomly determined. Random variance covers, for example, changes to the at least one emission characteristic in which the timing, duration, amount, and/or speed of the change is randomly determined. The random (or stochastic) variation of the signal may be characterized by or dependent on a predetermined spectral distribution of the light emitted by light sources 110. Other aspects of changes to emission characteristics that can be randomly determined to result in the disclosed random variance will be known to one of ordinary skill in the art from the description herein. It will be understood that while at least one factor of the change may be randomly determined, other factors of the change may still be predetermined or selected.

Where multiple control systems are utilized, different emission characteristics may be randomly varied by different control systems 120. In an exemplary embodiment, system 100 includes a centralized control system 120 and distributed control systems assigned to respective light sources 110. The distributed control systems are configured to randomly vary the intensity and/or spectral power density of the associated light source 110, while the centralized control system 120 is configured to randomly vary the spatial gradient of light in the environment illuminated by lighting system 100.

Likewise, when multiple light sources 110 are used, the emission characteristics of each light source 110 may be controlled in a synchronous or asynchronous manner. In one embodiment, the random variance of emission characteristics of each light source 110 may be coordinated or controlled to occur simultaneously. In an alternative embodiment, the random variance of emission characteristics of each light source may be uncoordinated and independent from each other light sources.

System 100 may further comprise a source of noise 130. Source 130 generates a noise signal which is provided to control system 120. Suitable sources of noise will be known to one of ordinary skill in the art from the description herein.

In an exemplary embodiment, the noise signal is a pink noise (or 1/f noise) signal. Pink noise has a spectral power density inversely proportional to the frequency of the noise. In a preferred embodiment, the pink noise used to generate the random variance follows a formula of $1/f^\alpha$, where f is the frequency of the variation and $\alpha$ is a constant satisfying the inequality $0.8<\alpha<1.3$. The noise signal may further be a flicker noise signal. Other suitable noise signals will be known to one of ordinary skill in the art from the description herein.

Control system 120 uses the noise signal from source 130 to generate the random variance in the at least one emission characteristic. For one example, control system 120 may vary the at least one emission characteristic whenever the noise signal falls inside or outside a certain range, or equals a certain value. For another example, control system 120 may use a value of the noise signal (such as the amplitude or frequency of the noise signal) to calculate a value for the at least one emission characteristic. Other control schemes incorporating the noise signal from source 130 to randomly vary the at least one emission characteristic will be apparent to those of ordinary skill in the art from the description herein.

The following enumerate specific embodiments of random variance that may be generated by control system 120. It will be understood by one of ordinary skill in the art that these embodiments are provided for the purposes of illustration, and are not intended to be limiting. To the contrary, any of these embodiments may be modified or combined to result in different types of random variance without departing from the scope of the present invention.

Control system 120 may be configured to randomly vary at least one emission characteristic of light for a predetermined period of time. For example, it may be predetermined what range of time living subjects are expected to be present in the environment illuminated by lighting system 100. Then, control system 120 may randomly vary the spectral power density and/or intensity of light only during this period of time. When this predetermined period of time ends, control system 120 stops randomly varying the at least one emission characteristic.

The predetermined period of time in the above embodiment may, but need not be, a constant period of time. The period of time may itself vary at a predetermined frequency. For example, the predetermined period of time may be longer on some days or during some hours than it is on other days or during other hours.

Control system 120 may be configured to randomly vary the at least one emission characteristic of light at predetermined frequencies. For example, it may be predetermined that the intensity of the emitted light should change slowly (over the course of a day), and/or that the spectral power density of the emitted light should change quickly (e.g. every minute or second). Then, control system 120 may randomly vary the intensity and/or spectral power density based on these distinct frequencies.

Control system 120 may be configured to randomly vary the at least one emission characteristic of light within a predetermined range of values. For example, a range of appropriate values (e.g., such as a range of appropriate intensity values) and/or an average or mean value may be predetermined for a particular environment or for a particular task occurring in the environment. Appropriate ranges for intensity values of the emitted light may be predetermined from various standards on lighting environments (such as those propounded by the Illuminating Engineering Society). In an exemplary embodiment, the range of the emitted light may be predetermined based on the "IEEE Recommended Practices for Modulating Current in High-Brightness LEDs for Mitigating Health Risks to Viewers," prepared by the Institute of Electrical and Electronics Engineers (IEEE), the contents of which are incorporated herein by reference in their entirety. Then, control system 120 may randomly vary the intensity of light only within the predetermined range, or within a predetermined distance from an average or mean value. Control system 120 may be prevented from randomly varying the intensity of light to a value falling outside the predetermined range or far enough away from a predetermined average or mean.

The predetermined range in the above embodiment may, but need not be, a constant range. The predetermined range may itself vary at either a predetermined time and/or a predetermined frequency. For example, the predetermined range for the emission characteristic may be broader at one time of day than at another time of day.

Control system 120 may be configured to randomly vary the at least one emission characteristic of the light by at least a predetermined amount. For example, it may be predetermined what amount of variation to an emission characteristic is necessary for the variation to be perceptible to a subject. Then, control system 120 may randomly vary the intensity or spectral power density of the light by at least this predetermined amount, in order for the change to be perceptible to the subject.

Control system 120 may be configured to randomly vary the at least one emission characteristic of light over a predetermined frequency range of the light emitted by light sources 110. For example, it may be desired to only change the visible portion of the emitted light (or some sub-portion of the visible portion), while leaving an infrared or other non-visible portion of the light unchanged. Accordingly, control system 120 may randomly vary the spectral power density and/or intensity of light only for the visible portion (or sub-portion of the visible portion) of the light.

In an exemplary embodiment, light source 110 includes a particularized driver for each frequency range of light to be randomly varied by control system 120. For example, light source 110a may include a first driver 111a for driving a predominantly blue solid state light 112a, a second driver 113a for driving a predominantly green solid state light 114a, and a third driver 115a for driving a predominantly red solid state light 116a. In this example, control system 120 communicates with the particularized driver 111a, 113a, 115a in order to randomly vary the spectral power density and/or intensity of the desired frequency range of light emitted by light source 110a. For another example, light source 110b may include a first driver 111b for driving a predominantly ultraviolet solid state light 112b, a second driver 113b for driving a predominantly visible solid state light 114b, and a third driver 115b for driving a predominantly infrared solid state light 116b. In this example, control system 120 communicates with the particularized driver 111b, 113b, 115b in order to randomly vary the spectral power density and/or intensity of the desired frequency range of light emitted by light source 110b.

Control system 120 may be configured to randomly vary the at least one emission characteristic of light within a predetermined area. For example, it may be predetermined which portion of the environment illuminated by lighting system 100 is expected to include living subjects. Then, control system 120 may randomly vary the emission characteristic only within this area of the environment. Outside of this predetermined area, control system 120 does not randomly vary the at least one emission characteristic.

In addition to the random variance described above, control system 120 may further be configured to vary the at least one emission characteristic in a predetermined or non-random manner. The predetermined variance of the at least one emission characteristic may occur either at a predetermined time or at a predetermined frequency. For example, in addition to random variations, control system 120 may vary the at least one emission characteristic in a circadian rhythm or cycle.

Control system 120 may further comprise at least one sensor 140. Sensor 140 is configured to detect an aspect of the environment illuminated by (or adjacent to) light sources 110. For example, sensor 140 may detect one or more ambient conditions of the environment, such as light level, temperature, humidity, barometric pressure, and/or noise. Suitable ambient condition sensors for use as sensor 140 will be known to one of ordinary skill in the art from the condition herein.

Sensor 140 may be configured to detect an aspect of at least one living subject in the environment illuminated by (or adjacent to) light sources 110. For example, sensor 140 may be a motion sensor configured to detect any movement of the living subject in the environment. For another example, sensor 140 may be a physiological sensor, configured to detect one or more physiological characteristics of the subject. Such a physiological sensor 140 may desirably be contactless or noninvasive, but may also be a conventional contact-based sensor. Physiological characteristics sensed by sensor 140 may include, for example, temperature, heart rate, breathing rate, blood pressure, oxygen saturation, brain activity, eye tracking, body chemistry, electrodermal activity, or others. Suitable motion or physiological sensors for use as sensor 140 will be known to one of ordinary skill in the art from the condition herein.

The conditions sensed by sensor 140 are communicated to control system 120 for use in controlling light sources 110. In particular, control system 120 may randomly vary the at least one emission characteristic of light emitted by light sources 110 based on the aspect(s) of the environment and/or the subject sensed by sensor 140. For one example, sensor 140 may detect a level of ambient light, and control system 120 may adjust the range of intensities for the emitted light based on the detected level of ambient light. For another example, sensor 140 may detect that a living subject is now present in a previously empty room or environment. Control system 120 may then begin randomly varying the intensity and/or spectral power density of light sources 110 in response to the detection that a subject is present. Control system 120 is desirably configured to vary the emission characteristics in real time based on feedback from sensor 140.

Figure 3:
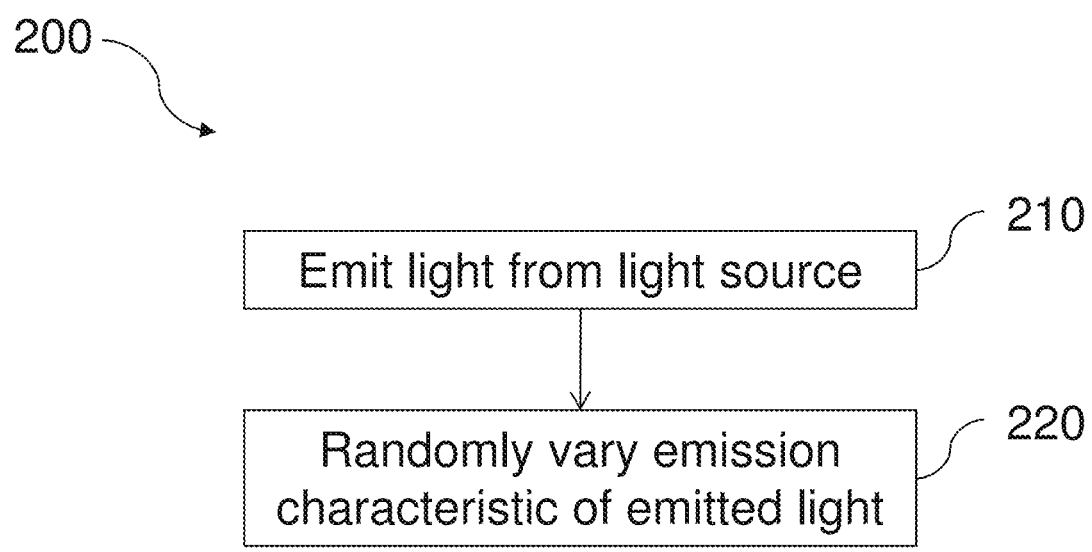
FIG. 3 is a flowchart illustrating an exemplary method for lighting an environment in accordance with aspects of the present invention.

FIG. 3 illustrates an exemplary method 200 for lighting an environment in accordance with aspects of the present invention. In general, method 200 includes emitting light and varying the emitted light. Additional details of method 200 are described below with respect to the components of system 100.

In step 210, light is emitted from a light source. In an exemplary embodiment, one or more light sources 110 emit light. The light has a plurality of emission characteristics, including intensity, spectral power density, and gradient, as described above.

In step 220, the emitted light is randomly varied. In an exemplary embodiment, control system 120 randomly varies at least one emission characteristic of the emitted light. Control system 120 may randomly vary the emission characteristic based on any of the embodiments set forth above with respect to system 100.

Step 220 may include randomly varying the intensity, spectral power density, and/or spatial gradient of the light emitted by light sources 110. Step 220 may further include randomly varying the emission characteristic using a pink noise signal to control the timing, type, or amount of variance. Step 220 may further include the step of varying the emission characteristic for a predetermined period of time, over a predetermined range of values, over a predetermined frequency range of light, or in a predetermined area, as set forth above with respect to system 100.

Method 200 is not limited to the above steps, but may include alternate or additional steps, as would be understood by one of ordinary skill in the art from the description herein.

Method 200 may further include the step of detecting an aspect of the environment with a sensor. This step may involve detecting an ambient characteristic of the environment, and/or detecting an aspect of a living subject in the environment. The method may then randomly vary the emission characteristic based on the aspect of the environment and/or subject detected with the sensor.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A lighting system comprising:
   at least one light source, the at least one light source configured to emit light having a plurality of emission characteristics; and
   a control system in communication with the at least one light source, the control system comprising at least one sensor configured to detect an aspect of a subject in an environment illuminated by the at least one light source, the control system configured to randomly vary at least one of the emission characteristics of the light emitted by the light source, the at least one of the emission characteristics being randomly varied by at least an amount that is perceptible to the subject, based on the detected aspect, in response to a noise signal having an amplitude or a frequency falling outside of a range of noise signal amplitudes or a range of noise signal frequencies,
   wherein the aspect comprises one or more physiological characteristics of the subject.

2. The lighting system of claim 1, wherein the light source comprises one or more solid state lighting elements.

3. The lighting system of claim 2, wherein the light source comprises two or more solid state lighting elements, the two or more solid state lighting elements configured to emit light having different emission characteristics.

4. The lighting system of claim 2, wherein the light source further comprises at least one lighting element selected from a group consisting of fluorescent lighting elements and incandescent lighting elements.

5. The lighting system of claim 1, wherein the plurality of emission characteristics include at least one characteristic selected from the group consisting of intensity, spectral power density, and spatial gradient.

6. The lighting system of claim 1, wherein the at least one light source comprises a plurality of light sources, and
   the control system is in communication with one or more of the plurality of light sources.

7. The lighting system of claim 1, wherein the at least one light source comprises a plurality of light sources, and each of the plurality of light sources has an associated control system.

8. The lighting system of claim 1, wherein the noise signal is a pink noise signal.

9. The lighting system of claim 1, wherein the noise signal is a flicker noise signal.

10. The lighting system of claim 1, wherein the control system is configured to randomly vary the at least one emission characteristic for a predetermined period of time.

11. The lighting system of claim 1, wherein the control system is further configured to vary the at least one emission characteristic at one of a predetermined time or a predetermined frequency.

12. The lighting system of claim 1, wherein the control system is configured to randomly vary the at least one emission characteristic within a predetermined range of values.

13. The lighting system of claim 12, wherein the predetermined range varies at one of a predetermined time or a predetermined frequency.

14. The lighting system of claim 1, wherein the control system is configured to randomly vary the at least one emission characteristic over a predetermined frequency range of the light emitted by the light source.

15. The lighting system of claim 1, wherein the at least one sensor is configured to detect an ambient light of the environment.

16. The lighting system of claim 1, wherein the at least one sensor is configured to detect a movement of the subject in the environment.

17. The lighting system of claim 1, wherein the physiological characteristic includes one or more of temperature, heart beat, breathing rate, blood pressure, oxygen saturation, brain activity, eye tracking, body chemistry, and electrodermal activity of the subject.

18. The lighting system of claim 1, wherein the control system is further configured to use a value of the noise signal to determine a value for the at least one emission characteristic.

19. The lighting system of claim 18, wherein the value of the noise signal is a frequency of the noise signal.

20. The lighting system of claim 1, wherein the control system is configured to begin the random variation of the at least one of the emission characteristics, in response to detecting that the subject is present based on feedback from the sensor.

21. The lighting system of claim 1, wherein the control system comprises
distributed control systems each configured to randomly vary an emission characteristic of a respective light source of the at least one light source, and
a centralized control system configured to randomly vary a spatial gradient of light from the lighting system.

22. A method for lighting an environment comprising the steps of:
emitting light from a light source, the emitted light having a plurality of emission characteristics;
detecting with at least one sensor an aspect of a subject in the environment illuminated by the light source; and
randomly varying at least one of the emission characteristics of the emitted light, the at least one of the emission characteristics being randomly varied by at least an amount that is perceptible to the subject, based on the detected aspect, in response to a noise signal having an amplitude or a frequency falling outside of a range of noise signal amplitudes or a range of noise signal frequencies.

23. The method of claim 22, wherein the randomly varying step comprises randomly varying at least one characteristic selected from the group consisting of intensity, spectral power density, and spatial gradient.

24. The method of claim 22, wherein the noise signal is a pink noise signal.

25. The method of claim 22, wherein the randomly varying step comprises randomly varying the at least one emission characteristic for a predetermined period of time.

26. The method of claim 22, wherein the randomly varying step comprises randomly varying the at least one emission characteristic within a predetermined range of values.

27. The method of claim 22, wherein the physiological characteristic includes one or more of temperature, heart beat, breathing rate, blood pressure, oxygen saturation, brain activity, eye tracking, body chemistry, and electrodermal activity of the subject.

28. The method of claim 22, wherein the randomly varying of the at least one of the emission characteristics comprises randomly varying the at least one of the emission characteristics within a range of values corresponding to the at least one of the emission characteristics, wherein the range of values is greater at one time of day than at another time of day.

* * * * *